(12) United States Patent
Plondke et al.

(10) Patent No.: US 8,656,145 B2
(45) Date of Patent: Feb. 18, 2014

(54) METHODS AND SYSTEMS FOR ALLOCATING INTERRUPTS IN A MULTITHREADED PROCESSOR

(75) Inventors: Erich James Plondke, Austin, TX (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 978 days.

(21) Appl. No.: 12/233,688

(22) Filed: Sep. 19, 2008

(65) Prior Publication Data

US 2010/0077399 A1 Mar. 25, 2010

(51) Int. Cl.
*G06F 9/48* (2006.01)

(52) U.S. Cl.
USPC ............ 712/244; 718/102; 718/103; 718/107

(58) Field of Classification Search
USPC ........................... 718/102, 103, 107; 712/244
See application file for complete search history.

(56) References Cited

U.S. PATENT DOCUMENTS

| | | | | |
|---|---|---|---|---|
| 4,636,944 A | * | 1/1987 | Hodge | 710/264 |
| 5,197,138 A | * | 3/1993 | Hobbs et al. | 712/222 |
| 5,511,200 A | * | 4/1996 | Jayakumar | 710/266 |
| 5,515,538 A | * | 5/1996 | Kleiman | 710/260 |
| 5,613,128 A | | 3/1997 | Nizar et al. | |
| 6,041,377 A | | 3/2000 | Mayer et al. | |
| 6,249,830 B1 | | 6/2001 | Mayer et al. | |
| 6,567,839 B1 | * | 5/2003 | Borkenhagen et al. | 718/103 |
| 7,260,663 B2 | * | 8/2007 | Gregg et al. | 710/260 |
| 7,487,503 B2 | * | 2/2009 | Accapadi et al. | 718/103 |
| 7,552,236 B2 | * | 6/2009 | Greenfield et al. | 709/238 |
| 7,702,889 B2 | * | 4/2010 | Codrescu et al. | 712/244 |
| 7,774,585 B2 | * | 8/2010 | Ober et al. | 712/244 |
| 7,870,372 B2 | * | 1/2011 | Kang et al. | 712/244 |
| 7,913,255 B2 | * | 3/2011 | Codrescu | 718/101 |
| 7,962,913 B2 | * | 6/2011 | Accapadi et al. | 718/103 |
| 7,992,042 B2 | * | 8/2011 | Todoroki et al. | 714/34 |
| 8,041,754 B1 | * | 10/2011 | Marr | 707/899 |
| 2006/0037020 A1 | * | 2/2006 | Accapadi et al. | 718/102 |
| 2006/0200826 A1 | * | 9/2006 | Tamura et al. | 718/103 |
| 2007/0038818 A1 | * | 2/2007 | Greenfield et al. | 711/152 |
| 2008/0184246 A1 | * | 7/2008 | Accapadi et al. | 718/103 |

FOREIGN PATENT DOCUMENTS

| | | |
|---|---|---|
| CN | 1802635 A | 7/2006 |
| JP | 01097490 | 4/1989 |
| JP | 06159941 | 6/1994 |
| JP | 2005004562 A | 1/2005 |
| JP | 2006243865 A | 9/2006 |

(Continued)

OTHER PUBLICATIONS

International Search Report & Written Opinion—PCT/US2009/057123, International Search Authority—European Patent Office—Nov. 20, 2009.

(Continued)

*Primary Examiner* — Aimee Li
(74) *Attorney, Agent, or Firm* — Peter Michael Kamarchik; Nicholas J. Pauley; Joseph Agusta

(57) ABSTRACT

A multithreaded processor capable of allocating interrupts is described. In one embodiment, the multithreaded processor includes an interrupt module and threads for executing tasks. The interrupt module can identify a priority for each thread based on a task priority for tasks being executed by the threads and assign an interrupt to a thread based at least on its priority.

22 Claims, 9 Drawing Sheets

(56) References Cited

FOREIGN PATENT DOCUMENTS

| JP | 4302353 B2 | 7/2009 |
| KR | 20060096186 A | 9/2006 |
| TW | 200710723 A | 3/2007 |
| TW | 200743030 A | 11/2007 |

OTHER PUBLICATIONS

Taiwan Search Report—TW098131649—TIPO—Mar. 8, 2013.

* cited by examiner

METHODS AND SYSTEMS FOR ALLOCATING INTERRUPTS IN A MULTITHREADED PROCESSOR

FIELD OF THE DISCLOSURE

Embodiments of the inventive concepts disclosed herein relate generally to the field of data processing systems. More particularly, embodiments of the inventive concepts disclosed herein relate to allocating interrupts in multi-threaded processors.

BACKGROUND

Multithreaded processors can include two or more threads to increase the speed at which tasks can be processed. A thread may be hardware on which tasks are processed. A task may be a sequence of instructions associated with a system function, such as an application or program. Some applications or programs can be associated with two or more tasks at the same time. A thread can process or execute a task by executing the sequence of instructions associated with the task.

One thread can process one task at the same time as another thread processes another task. The stages of processing may include fetch (to get an instruction associated with the task), decode (to break down the instruction into the operation and the operands), retrieve operands from the register file, execute the instruction, and write back the result. The process may be repeated for the next instruction in a task until all of the instructions of a task are executed. Each task may be associated with a priority and assigned to threads based on the priority. For example, software can assign a priority to each task and a scheduler can determine the next task with the highest priority to provide a thread that is ready to process a task.

The threads may also be capable of processing interrupts. An interrupt may be a notification associated with an interrupt handler from a system device or generated by software. An interrupt handler may be a routine that is an unscheduled task. When an interrupt is received, it may be processed by any thread of the multithreaded processor. For example, the interrupt handler can be provided to the first thread at the fetch stage, whether or not the thread is currently processing an instruction of a task or whether other threads are in wait mode (i.e. not processing any tasks). Processing the interrupt includes a thread stopping the processing of instructions of a task and processing a sequence of instructions associated with the interrupt handler.

The thread that stops processing its current task to process the interrupt may be a high priority thread, such as by processing a high priority task. It is desirable for high priority threads to continue processing high priority tasks and not stop their processing for interrupts if one or more threads are in wait mode or processing low priority threads are available to process the interrupt.

Accordingly, systems and processes for a multithreaded processor is desirable that can allocate interrupts to decrease overhead from executing interrupts on high priority threads when other threads are available to process the interrupts.

SUMMARY OF THE DISCLOSURE

In an embodiment, a multithreaded processor is described. The multithreaded processor includes an interrupt module and threads for executing tasks. Each thread can execute a task. The interrupt module can identify a priority for each of the threads and assign an interrupt to one of the threads based at least on its priority.

This illustrative embodiment is mentioned not to limit or define the inventive concepts disclosed herein, but to provide examples to aid understanding thereof. Other aspects, advantages, and features of the present disclosure will become apparent after review of the entire application, including the following sections: Brief Description of the Drawings, Detailed Description, and the Claims.

BRIEF DESCRIPTION OF THE DRAWINGS

These and other features, aspects, and advantages of the present inventive concepts disclosed herein are better understood when the following Detailed Description is read with reference to the accompanying drawings, wherein.

DETAILED DESCRIPTION

Figure 1:
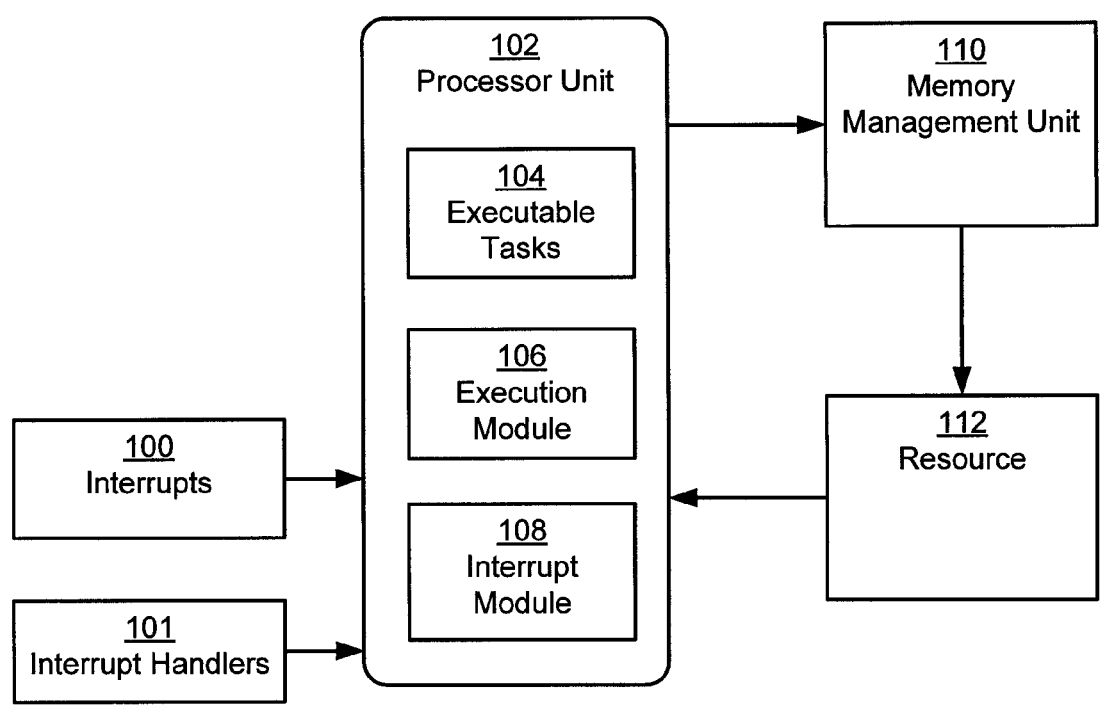
FIG. 1 is a general diagram illustrating an example of a processor unit allocating interrupts to processor threads.

Throughout the description, for the purposes of explanation, numerous specific details are set forth in order to provide a thorough understanding of the inventive concepts disclosed herein. It will be apparent, however, to one skilled in the art that the inventive concepts disclosed herein may be practiced without some of these specific details. In other instances, well-known structures and devices are shown in block diagram form to avoid obscuring the underlying principles of the inventive concepts disclosed herein.

Embodiments of the inventive concepts disclosed herein relate to multithreaded processors capable of allocating interrupts to threads based on thread priority. The priority of a thread can be based on whether the thread is executing a task and/or the priority of the task it is executing. In some embodiments, the priority of each task is generated by software and received by a processor unit of the multithreaded processor. When a thread is executing a task, the priority of the thread can correspond to the task it is executing. When a thread is in wait mode (i.e. not executing a task), its priority may correspond to the lowest possible priority. In some embodiments, two priorities, such as a "1" and "0" are used to indicate the thread is executing a task, "1", or in wait mode, "0", and the interrupt is allocated based on the priorities, such as an allocation to a thread in wait mode and associated with "0".

A task can include a sequence of instructions associated with each other. A processor thread can execute a task by processing each of the instructions associated with that task. Multithreaded processors may execute two or more tasks at the same time by processing a sequence of instructions associated with one task on one thread and a sequence of instructions associated with another task on another thread.

A processor unit of the multithreaded processor can receive an interrupt and determine a thread to provide the interrupt based on priorities of the threads. For example, the processor unit can identify a thread that is in wait mode or, if all threads in the multithreaded processor are executing tasks, identify the thread with the lowest priority. The processor unit can direct the interrupt to the identified thread.

An interrupt may be a notification associated with an unscheduled event, such as an interrupt handler, received from a device or system software. For example, the interrupt handler may be an unscheduled task that includes a sequence of instructions to be processed by a thread. In some embodiments, the interrupt includes a priority. The processor unit can determine whether to stop an executing task based on the priority of the threads and the priority of the interrupt. For example, the processor unit can determine whether the interrupt priority is higher than the priority of a thread. If the interrupt priority is higher than a thread priority, the thread with the lowest priority can be stopped and the interrupt can be provided to that thread. If the interrupt priority is lower than the threads, the interrupt can be queued until a thread completes executing its current task or, otherwise until tasks with priorities higher than the interrupt have been executed. By allocating interrupts based on thread priority, certain processor unit embodiments can decrease overhead, such as latency due to interrupt processing, and/or allow high priority tasks to be executed earlier.

Multithreaded processors according to some embodiments can be implemented with various components of a processing system to access data during execution of a task. FIG. 1 shows a block diagram of an implementation of one embodiment of a multithreaded processor that includes a processor unit 102 for allocating interrupts 100 that are associated with interrupt handlers 101 to processor threads. In some embodiments, the processor unit 102 includes executable tasks 104, such as tasks in a task queue or otherwise, each including a sequence of instructions to be executed by a processor thread. Instructions associated with tasks can be executed in an execution module 106 that includes threads and a register or other temporary storage component associated with each thread that stores a priority for the associated thread. The execution module 106 can include any number of threads, such as a limited number of threads. Each thread can execute a task, such as by executing a sequence of instructions associated with a task. The processor unit 102 can also include an interrupt module 108 that is capable of determining a thread to provide an interrupt or otherwise determine an allocation of interrupts 100 and their associated interrupt handlers 101.

Each task can be associated with a priority, such as a priority assigned by an operating system. The processor unit 102 or software, such an operating system, can use the priority to determine when to execute a task on a thread. In some embodiments, several tasks are received at the same time and are provided to a limited number of threads based on the priority of the tasks. Tasks associated with high priorities can be executed before tasks associated with low priorities.

The processor unit 102 can be coupled to a memory management unit 110 and a resource 112 that assists the processor unit 102 in its execution of tasks. During execution, the processor unit 102 may access a resource 112 via the memory management unit 110. For example, the processor unit 102 can provide a request for data, instructions, operands, or other information from the resource 112. The memory management unit 110 can manage access to the resource 112 such as by using translation lookaside buffers or other components to provide a physical address of a memory location where the information sought by the processor unit 102 is located.

Interrupts 100 from system devices, such as resource 112 or otherwise, can be received and their associated interrupt handlers 101 executed by the processor unit 102. The interrupt module 108 is configured to allocate to the interrupts 100 based on a priority of the threads in the execution module 106, such as by stopping a relatively low priority thread or identifying a thread in wait mode to execute the interrupt.

Figure 2:
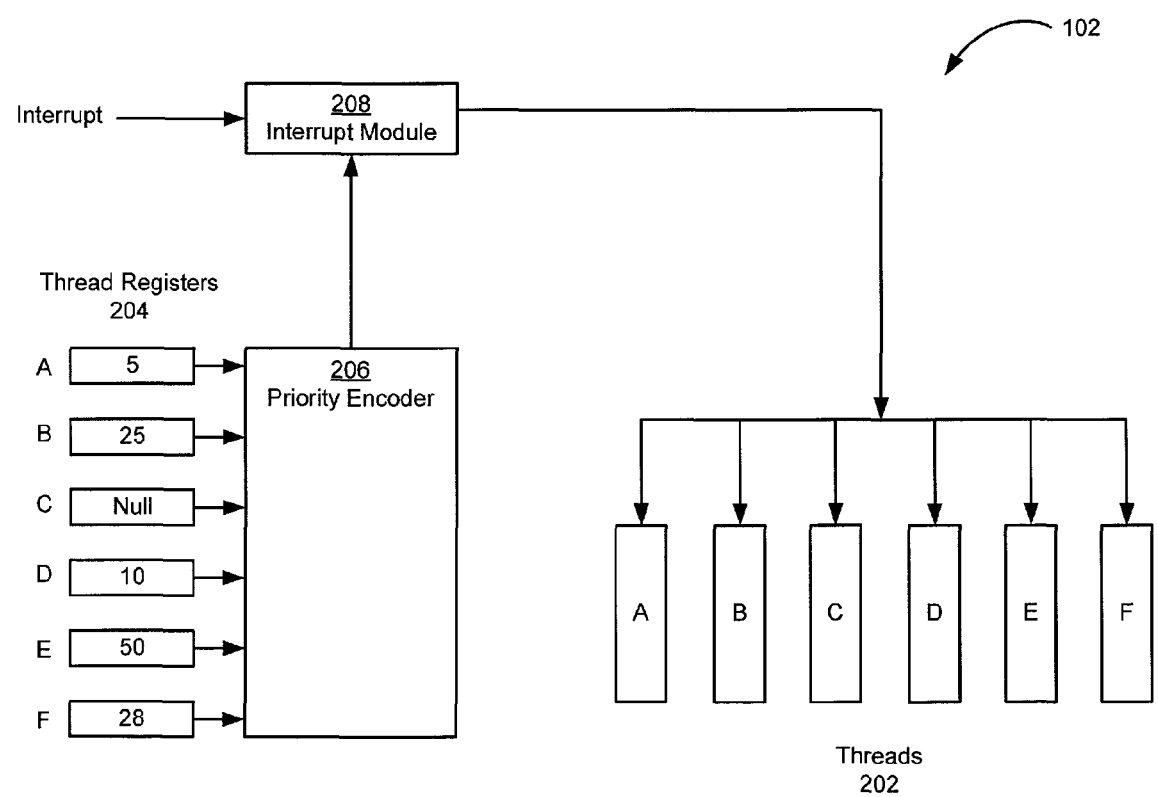
FIG. 2 is a general diagram illustrating an embodiment of the processor unit of FIG. 1.
Figure 3:
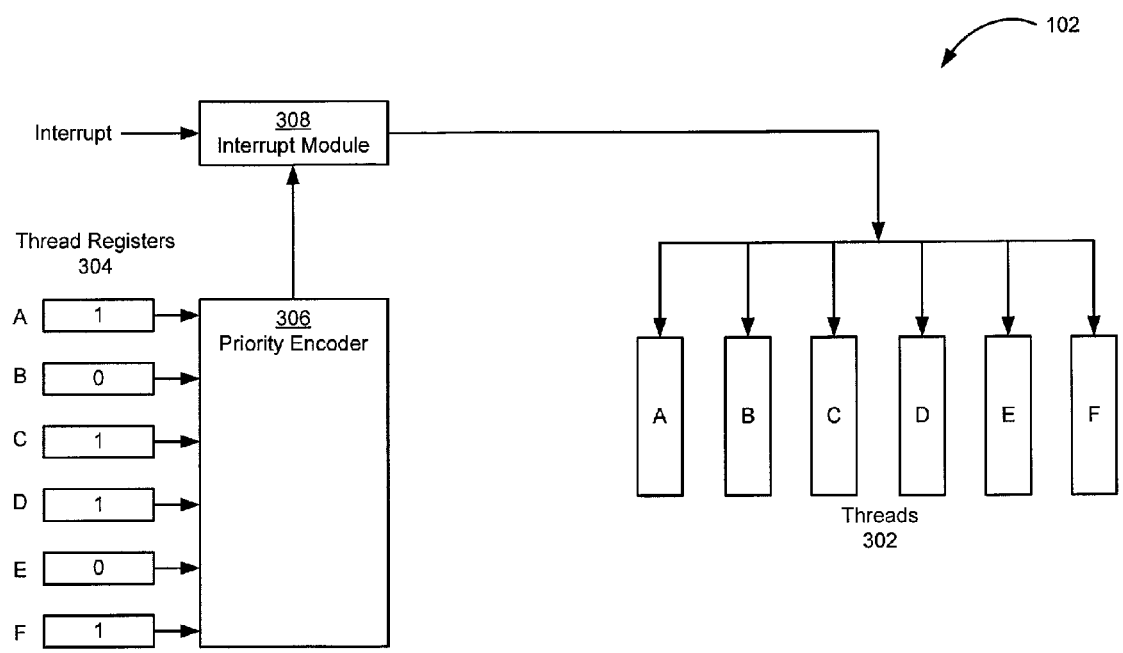
FIG. 3 is a general diagram of illustrating a second embodiment of the processor unit of FIG. 1.

Embodiments of the processor unit 102 can include various components to allocate interrupts among threads, including components that allocate an interrupt to a thread in wait mode and/or allocate an interrupt based on priorities of threads and of tasks waiting to be executed. FIGS. 2 and 3 illustrate embodiments of implementations of processor units configured to allocate interrupts. FIG. 2 illustrates an example of interrupt allocation to a thread in wait mode using scaled thread priorities. FIG. 3 illustrates an example of interrupt allocation to a thread based on a two-selection priority.

The processor unit 102 in FIG. 2 is a multithreaded processor that includes an execution module with threads 202. For illustrative purposes, the threads 202 include six threads A-F. Any number of threads can be used. The execution module also includes thread registers 204A-F that store a priority for each of the threads 202. Each thread register is associated with a thread. For example, thread register 204A corresponds to thread 202A. When a thread is executing a task, a priority corresponding to the task priority is stored in a register associated with the thread. When the thread completes or otherwise stops executing a task, the priority in the associated register is changed to "null." A priority of "null" may correspond to the lowest possible priority. When the thread gets another task to execute, a priority corresponding to the priority of the task is stored in the associated register.

In some embodiments, the register stores one or more bits that identify a value for the priority. Any priority scale can be used to represent the relative thread priority. In the embodiment illustrated in FIG. 2, numbers between "1" and "99" are used with lower numbers representing a higher priority. For example, thread register 204A includes a priority of "5" representing the relative priority of thread 202A. Thread register 204B includes a priority of "25" representing the relative priority of thread 202B and indicating thread 202A has a higher priority than thread 202B. Thread register 204C includes a priority of "null" that indicates thread 202C is not currently executing a task and is in wait mode. The scale, including number values and "null" to indicate thread priority values, is used for exemplary purposes and any identification of relative thread priorities and of threads in wait mode can be used.

The execution module also includes a priority encoder 206 coupled to the thread registers 204. The priority encoder 206 can be configured to receive the priorities in the thread registers 204 and determine a register that includes the lowest priority. In the embodiment shown, the priority encoder 206 determines the thread associated with the register that includes the "null" since it is the lowest priority. For example, the thread registers 204 can each provide the priority and identification of the thread associated with the thread register to the priority encoder 206. In the embodiment shown in FIG. 2, thread register 204C includes a "null" and is identified by the priority encoder 206 as the thread with the lowest priority.

The thread identified by the priority encoder 206 is provided to an interrupt module 208 that is configured to allocate an interrupt based on the priority information received from the priority encoder 206. In some embodiments, the priority encoder 206 continuously provides priority information to the interrupt module 208. In other embodiments, the priority encoder 206 provides priority information to the interrupt module 208 after receiving a request for such information from the interrupt module 208.

The interrupt module 208 can receive an interrupt and allocate it to one of the threads 202. In some embodiments, the interrupt module 208 determines a priority for the interrupt and uses the interrupt priority in addition to the thread priority received from the priority encoder 206 to allocate the interrupt. In other embodiments, the interrupt module 208 allocates the interrupt without determining a priority for the interrupt. The interrupt module 208 can allocate the interrupt by identifying the thread having the lowest priority, such as a thread in wait mode, and provide the interrupt to the identified thread. For example, since thread 202C is the lowest priority thread as it is in wait mode, the interrupt module 208 identifies thread 202C and provides the interrupt to thread 202C. Thread 202C executes the interrupt without disrupting execution of other threads, such as high priority threads.

If all the threads 202 are executing tasks, the interrupt module 208 can also be configured to provide the interrupt with a low priority thread. The low priority thread can stop executing a task and begin processing the interrupt by executing instructions of an interrupt handler associated with the interrupt. For example, if thread 202C is executing a task having a priority of "17", the priority encoder 206 identifies thread 202E as having the lowest priority and provides the identification of 202E to the interrupt module 208. The interrupt module 208 can stop the task executing in thread 202E and receive the interrupt for execution. For example, thread 202E may stop executing an instruction of a sequence of instructions associated with the task and begin executing instructions of an interrupt handler associated with the interrupt. Thread 202E executes the interrupt without disrupting higher priority threads. The task formally executing in thread 202E may be stalled until a thread completes execution and is ready to execute another task.

In some embodiments, interrupts can be allocated based on simpler thread priorities, such as those that indicate a thread is in wait mode or executing a task. FIG. 3 illustrates an embodiment of the processor unit 102 that includes an execution module with threads 302A-F and thread registers 304A-F corresponding to the threads 302A-F. The thread registers 304A-F each include a "1" or "0" to indicate a priority for each thread. A "1" can indicate that the associated thread is currently executing a task and a "0" can indicate that the associated thread is in wait mode. For example, thread registers 304A, 304C, 304D, and 304F each include a "1" indicating the associated threads 302A, 302C, 302D, and 302F are executing a task. Thread registers 304B and 304E each include a "0" indicating the associated threads 302B and 302E are not executing a task and are in wait mode.

The thread registers 304A-F are coupled to a priority encoder 306 that identifies thread priorities to an interrupt module 308. In some embodiments, the priority encoder 306 is configured to identify the one or more threads in wait mode to the interrupt module 308 based on the priorities from thread registers 304A-F. In the embodiment shown in FIG. 3, for example, the priority encoder 306 may identify threads 302B and 302E to the interrupt module 308. The interrupt module 308 can provide the interrupt to one of the identified threads 302B or 302E where it can be processed without the need for a thread currently processing a task to stop and accept the interrupt.

In some embodiments, all threads 302A-F may be processing a task and each of the thread registers 304A-F can include a "1" indicating each associated thread is currently processing a task. The priority encoder 306 can be configured to provide an indication to the interrupt module 308 that all threads 302A-F are processing a task. The interrupt module 308 can provide the interrupt and its interrupt handler to one of the threads 302A-F. The thread can stop processing its task and begin processing the interrupt by executing instructions associated with its interrupt handler.

Figure 4:
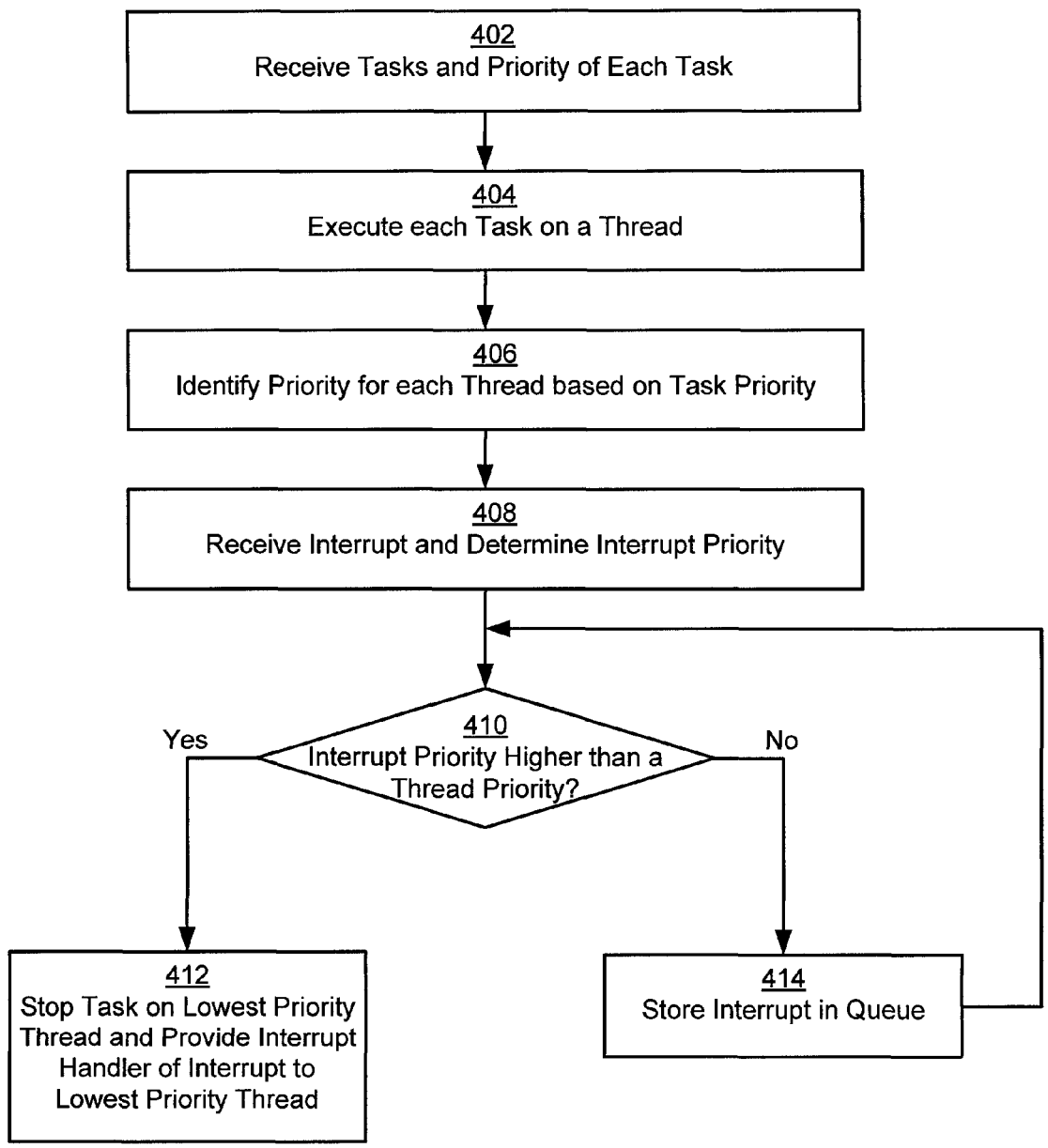
FIG. 4 is a flow chart illustrating an exemplary process for allocating an interrupt to processor threads.

As described above, various methods can be implemented to allocate an interrupt in a multithreaded processor. Certain embodiments of the allocation methods can allocate interrupts based on thread priority, interrupt priority, and/or priority of tasks in a task queue. FIG. 4 illustrates an exemplary interrupt allocation method according to one embodiment that allocates interrupts based on thread priority and interrupt priority.

The method may begin at block 402 when a processor unit receives tasks for execution and a priority for each task. The tasks may be received from a software program or other system application, and include a sequence of instructions that are executed by a thread in a multithreaded processor. The priority for each task may be determined by system software such as an operating system. In some embodiments, the processor unit includes logic configured to determine a priority for each task when it is received.

Each task is executed on a thread in block 404. If the number of tasks exceeds the number of threads available for executing tasks. In some embodiments, a scheduler identifies the priority for each task and provides the highest priority tasks to the threads first for execution.

In block 406, the processor unit identifies a priority for each thread based on the task priority. In some embodiments, the processor unit monitors the threads and identifies the priority of the task executing on each thread. The priority for each thread can correspond to the priority of the task executing on the thread. The processor unit can also identify a priority for threads that are in wait mode. The processor unit can store the priority for each thread in a register associated with the thread.

In block 408, the processor unit receives an interrupt from a system device or software application and determines its priority. The interrupt may be associated with an interrupt handler that is an unscheduled task. In some embodiments, the interrupt priority is received with the interrupt. For example, system software, such as an operating system, assigns a priority to the interrupt when the interrupt is created. In other embodiments, the processor unit retrieves a priority for the interrupt by accessing a memory or other system component.

In block 410, an interrupt module in the processor unit determines whether the interrupt priority is higher than at least one thread. In some embodiments, the interrupt module receives a priority for each of the threads and compares them to the interrupt priority. If the interrupt priority is higher than at least one thread, the thread having the lowest priority is identified, stops processing its task, and the interrupt handler associated with the interrupt is provided to the thread having the lowest priority in block 412. If the interrupt priority is not higher than at least one thread, the interrupt is stored in a queue in block 414. The method returns to block 410 to determine if the interrupt priority is higher than at least one thread and continues until the interrupt priority is higher than at least one thread. In some embodiments, the interrupt is stored in a queue and provided to a thread when a thread is available and the interrupt is the highest priority of interrupts and/or tasks in the queue.

Example Devices Including the Above Described Features

Processor units capable of allocating an interrupt to a processor thread may be included in any type of processor, such as digital signal processors. The general diagrams of FIGS. 5-9 illustrate example devices that may incorporate processor units for allocating an interrupt to a thread of a multithreaded processor.

Figure 5:
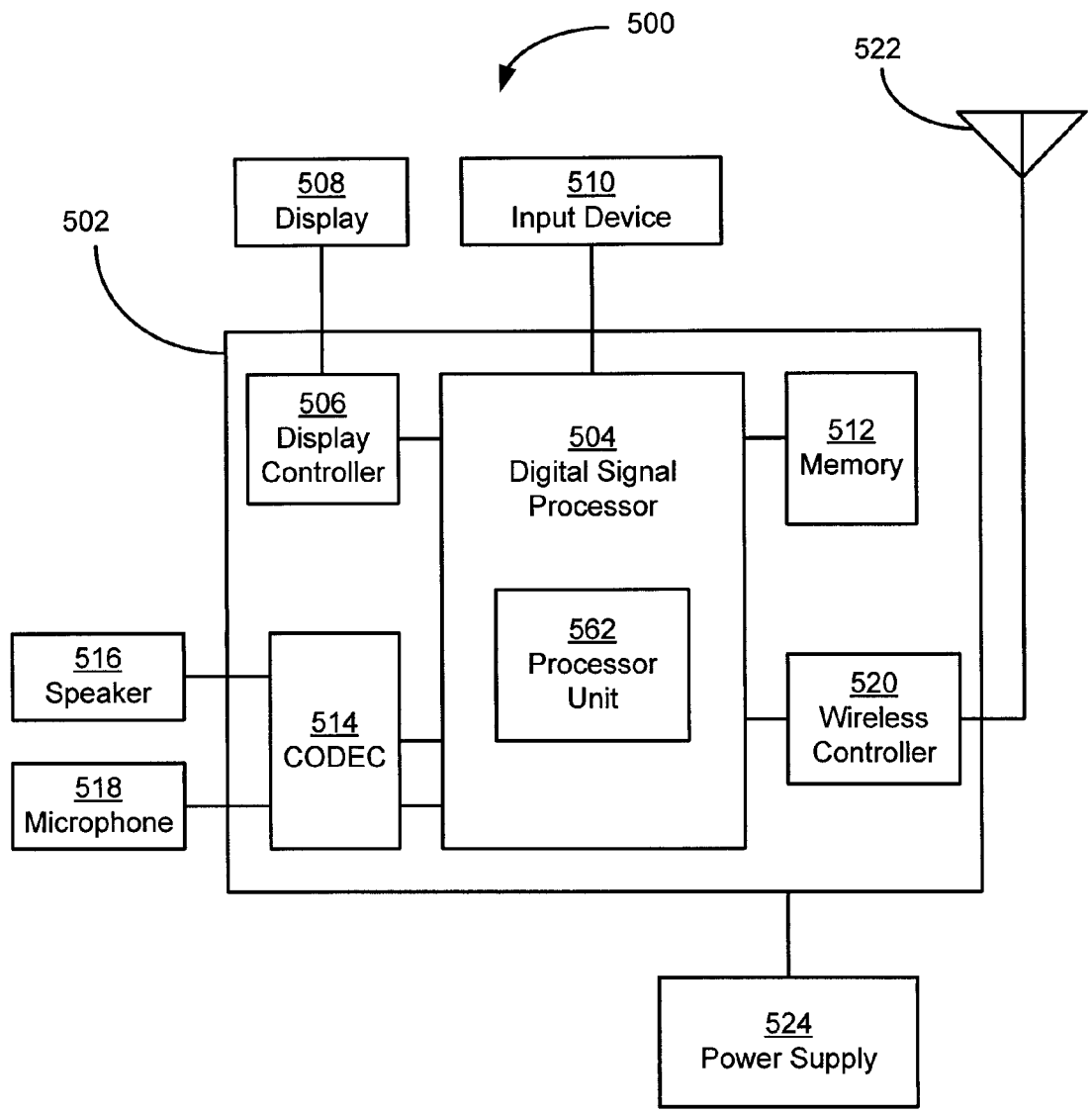
FIG. 5 is a general diagram illustrating an example portable communication device that may include an embodiment of a processor unit.

FIG. 5 is a diagram illustrating an exemplary embodiment of a portable communication device 500. As illustrated in the general diagram of FIG. 5, the portable communication device includes an on-chip system 502 that includes a digital signal processor (DSP) 504. The general diagram of FIG. 5 also shows a display controller 506 that is coupled to the DSP 504 and a display 508. Moreover, an input device 510 is coupled to the DSP 504. As shown, a memory 512 is coupled to the DSP 504. Additionally, a coder/decoder (CODEC) 514 may be coupled to the DSP 504. A speaker 516 and a microphone 518 may be coupled to the CODEC 514.

The general diagram of FIG. 5 further illustrates a wireless controller 520 coupled to the digital signal processor 504 and a wireless antenna 522. In a particular embodiment, a power supply 524 is coupled to the on-chip system 502. The display 508, the input device 510, the speaker 516, the microphone 518, the wireless antenna 522, and the power supply 524 may be external to the on-chip system 502. However, each can be coupled to a component of the on-chip system 502.

In a particular embodiment, the DSP 504 includes a processor unit 562, as described with reference to FIG. 2 or 3, that can allocate interrupts to threads and decrease overhead, such as latency due to interrupt processing, and/or allow high priority tasks to be executed earlier. For example, the DSP 504 may be a multi-threaded processor in which each thread can be assigned a priority based on the priority of the task the thread is processing. The processor unit 562 can receive an interrupt and determine a thread to which to send the interrupt for processing based on the priority of each thread, such as a thread that is not processing a task or a low priority thread.

Figure 6:
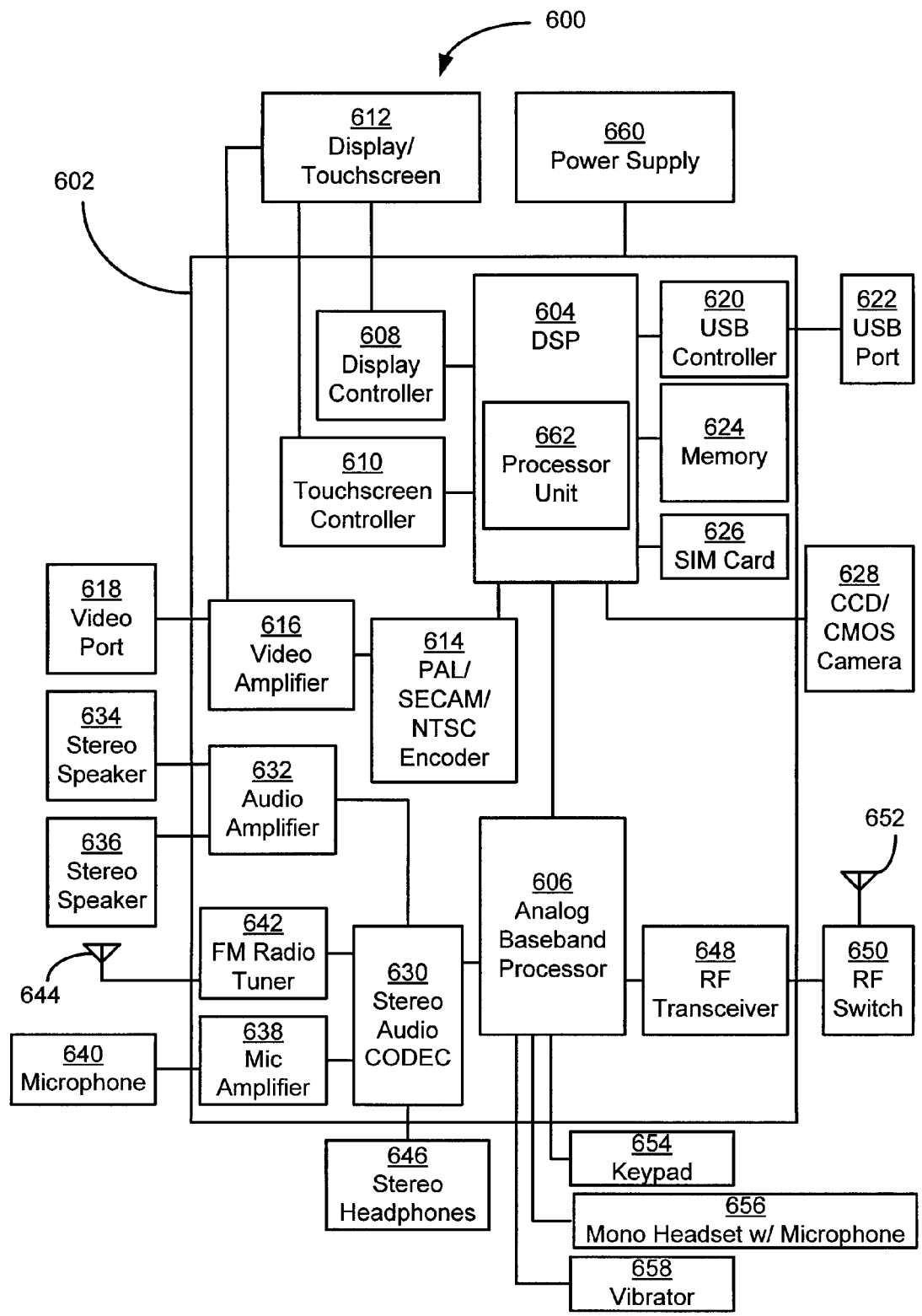
FIG. 6 is a general diagram illustrating an example cellular telephone that may include an embodiment of a processor unit.

FIG. 6 is a diagram illustrating an exemplary embodiment of a cellular telephone 600. As shown, the cellular telephone 600 includes an on-chip system 602 that includes a digital baseband processor 604 and an analog baseband processor 606 that are coupled together. In a particular embodiment, the digital baseband processor 604 is a digital signal processor. As illustrated in the general diagram of FIG. 6, a display controller 608 and a touchscreen controller 610 are coupled to the digital baseband processor 604. In turn, a touchscreen display 612 external to the on-chip system 602 is coupled to the display controller 608 and the touchscreen controller 610.

The general diagram of FIG. 6 further illustrates a video encoder 614, e.g., a phase alternating line (PAL) encoder, a sequential couleur a memoire (SECAM) encoder, or a national television system(s) committee (NTSC) encoder, is coupled to the digital baseband processor 604. Further, a video amplifier 616 is coupled to the video encoder 614 and the touchscreen display 612. Also, a video port 618 is coupled to the video amplifier 616. A universal serial bus (USB) controller 620 is coupled to the digital baseband processor 604. Also, a USB port 622 is coupled to the USB controller 620. A memory 624 and a subscriber identity module (SIM) card 626 may also be coupled to the digital baseband processor 604. Further, as shown in the general diagram of FIG. 6, a digital camera 628 may be coupled to the digital baseband processor 604. In an exemplary embodiment, the digital camera 628 is a charge-coupled device (CCD) camera or a complementary metal-oxide semiconductor (CMOS) camera.

As further illustrated in the general diagram of FIG. 6, a stereo audio CODEC 630 may be coupled to the analog baseband processor 606. Moreover, an audio amplifier 632 may be coupled to the stereo audio CODEC 630. In an exemplary embodiment, a first stereo speaker 634 and a second stereo speaker 636 are coupled to the audio amplifier 632. A microphone amplifier 638 may be also coupled to the stereo audio CODEC 630. Additionally, a microphone 640 may be coupled to the microphone amplifier 638. In a particular embodiment, a frequency modulation (FM) radio tuner 642 may be coupled to the stereo audio CODEC 630. An FM antenna 644 can be coupled to the FM radio tuner 642. Further, stereo headphones 646 may be coupled to the stereo audio CODEC 630.

The general diagram of FIG. 6 further illustrates a radio frequency (RF) transceiver 648 that may be coupled to the analog baseband processor 606. An RF switch 650 may be coupled to the RF transceiver 648 and an RF antenna 652. A keypad 654 may be coupled to the analog baseband processor 606. Also, a mono headset with a microphone 656 may be coupled to the analog baseband processor 606. Further, a vibrator device 658 may be coupled to the analog baseband processor 606. The general diagram of FIG. 6 also shows a power supply 660 that may be coupled to the on-chip system 602. In a particular embodiment, the power supply 660 is a direct current (DC) power supply that provides power to the various components of the cellular telephone 600. Further, in a particular embodiment, the power supply is a rechargeable DC battery or a DC power supply that is derived from an alternating current (AC) to DC transformer that is coupled to an AC power source.

As depicted in the general diagram of FIG. 6, the touchscreen display 612, the video port 618, the USB port 622, the camera 628, the first stereo speaker 634, the second stereo speaker 636, the microphone 640, the FM antenna 644, the stereo headphones 646, the RF switch 650, the RF antenna 652, the keypad 654, the mono headset 656, the vibrator 658, and the power supply 660 may be external to the on-chip system 602. In a particular embodiment, the digital baseband processor 604 may include a processor unit 662, as described with reference to FIG. 2 or 3, that can allocate interrupts to threads and decrease overhead, such as latency due to interrupt processing, and/or allow high priority tasks to be executed earlier. For example, the DSP 604 may be a multi-threaded processor in which each thread can be assigned a priority based on the priority of the task the thread is processing. The processor unit 662 can receive an interrupt and determine a thread to which to send the interrupt for processing based on the priority of each thread, such as a thread that is not processing a task or a low priority thread.

Figure 7:
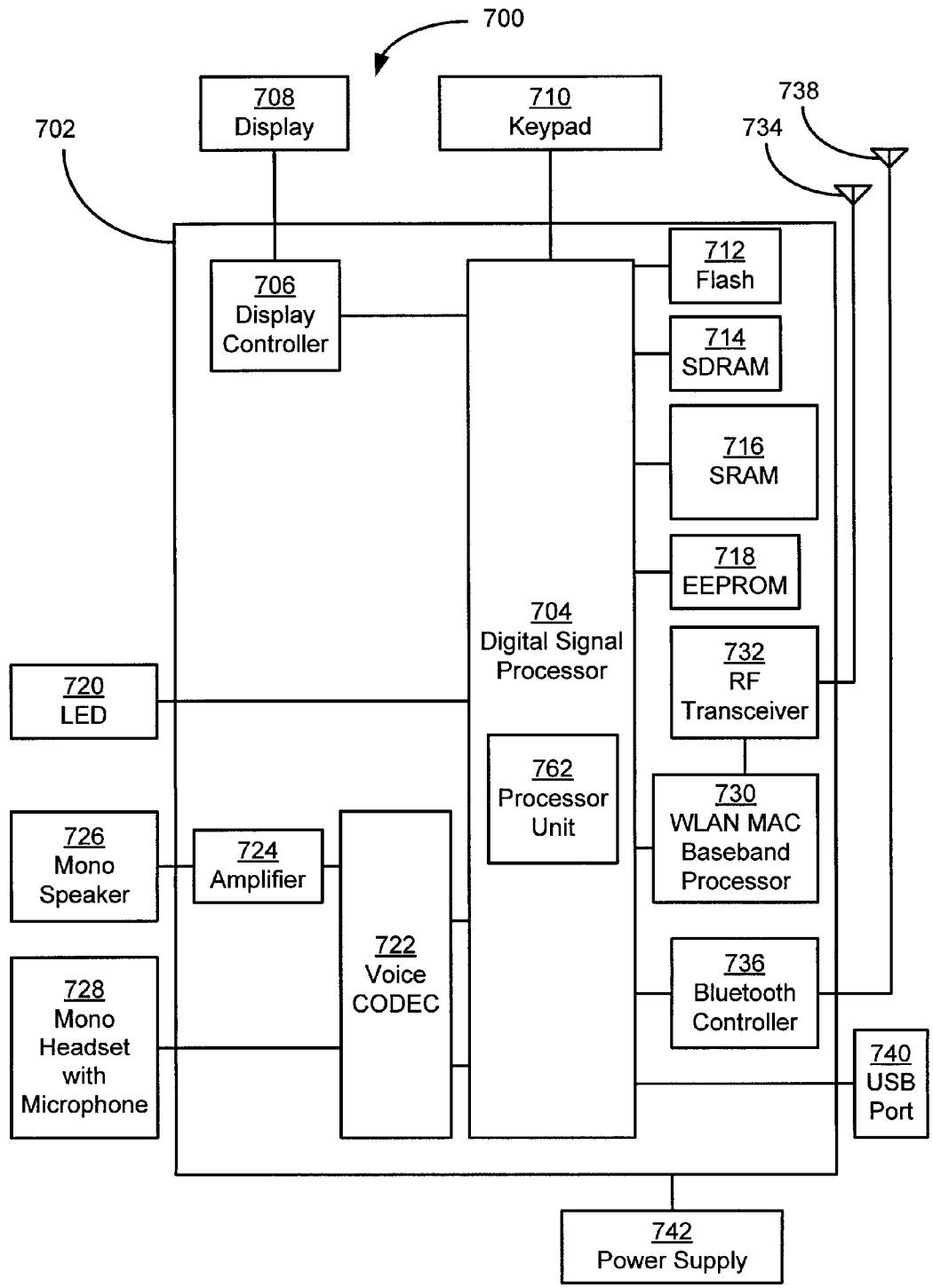
FIG. 7 is a general diagram illustrating an example wireless Internet Protocol telephone that may include an embodiment of a processor unit.

FIG. 7 is a diagram illustrating an exemplary embodiment of a wireless Internet protocol (IP) telephone 700. As shown, the wireless IP telephone 700 includes an on-chip system 702 that includes a digital signal processor (DSP) 704. A display controller 706 may be coupled to the DSP 704 and a display 708 is coupled to the display controller 706. In an exemplary embodiment, the display 708 is a liquid crystal display (LCD). FIG. 7 further shows that a keypad 710 may be coupled to the DSP 704.

A flash memory 712 may be coupled to the DSP 704. A synchronous dynamic random access memory (SDRAM)

714, a static random access memory (SRAM) 716, and an electrically erasable programmable read only memory (EEPROM) 718 may also be coupled to the DSP 704. The general diagram of FIG. 7 also shows that a light emitting diode (LED) 720 may be coupled to the DSP 704. Additionally, in a particular embodiment, a voice CODEC 722 may be coupled to the DSP 704. An amplifier 724 may be coupled to the voice CODEC 722 and a mono speaker 726 may be coupled to the amplifier 724. The general diagram of FIG. 7 further illustrates a mono headset 728 coupled to the voice CODEC 722. In a particular embodiment, the mono headset 728 includes a microphone.

A wireless local area network (WLAN) baseband processor 730 may be coupled to the DSP 704. An RF transceiver 732 may be coupled to the WLAN baseband processor 730 and an RF antenna 734 may be coupled to the RF transceiver 732. In a particular embodiment, a Bluetooth controller 736 may also be coupled to the DSP 704 and a Bluetooth antenna 738 may be coupled to the controller 736. The general diagram of FIG. 7 also shows that a USB port 740 may also be coupled to the DSP 704. Moreover, a power supply 742 is coupled to the on-chip system 702 and provides power to the various components of the wireless IP telephone 700.

As indicated in the general diagram of FIG. 7, the display 708, the keypad 710, the LED 720, the mono speaker 726, the mono headset 728, the RF antenna 734, the Bluetooth antenna 738, the USB port 740, and the power supply 742 may be external to the on-chip system 702 and coupled to one or more components of the on-chip system 702. In a particular embodiment, the DSP 704 includes a processor unit 762, as described with reference to FIG. 2 or 3, that can allocate interrupts to threads and decrease overhead, such as latency due to interrupt processing, and/or allow high priority tasks to be executed earlier. For example, the DSP 704 may be a multi-threaded processor in which each thread can be assigned a priority based on the priority of the task the thread is processing. The processor unit 762 can receive an interrupt and determine a thread to which to send the interrupt for processing based on the priority of each thread, such as a thread that is not processing a task or a low priority thread.

Figure 8:
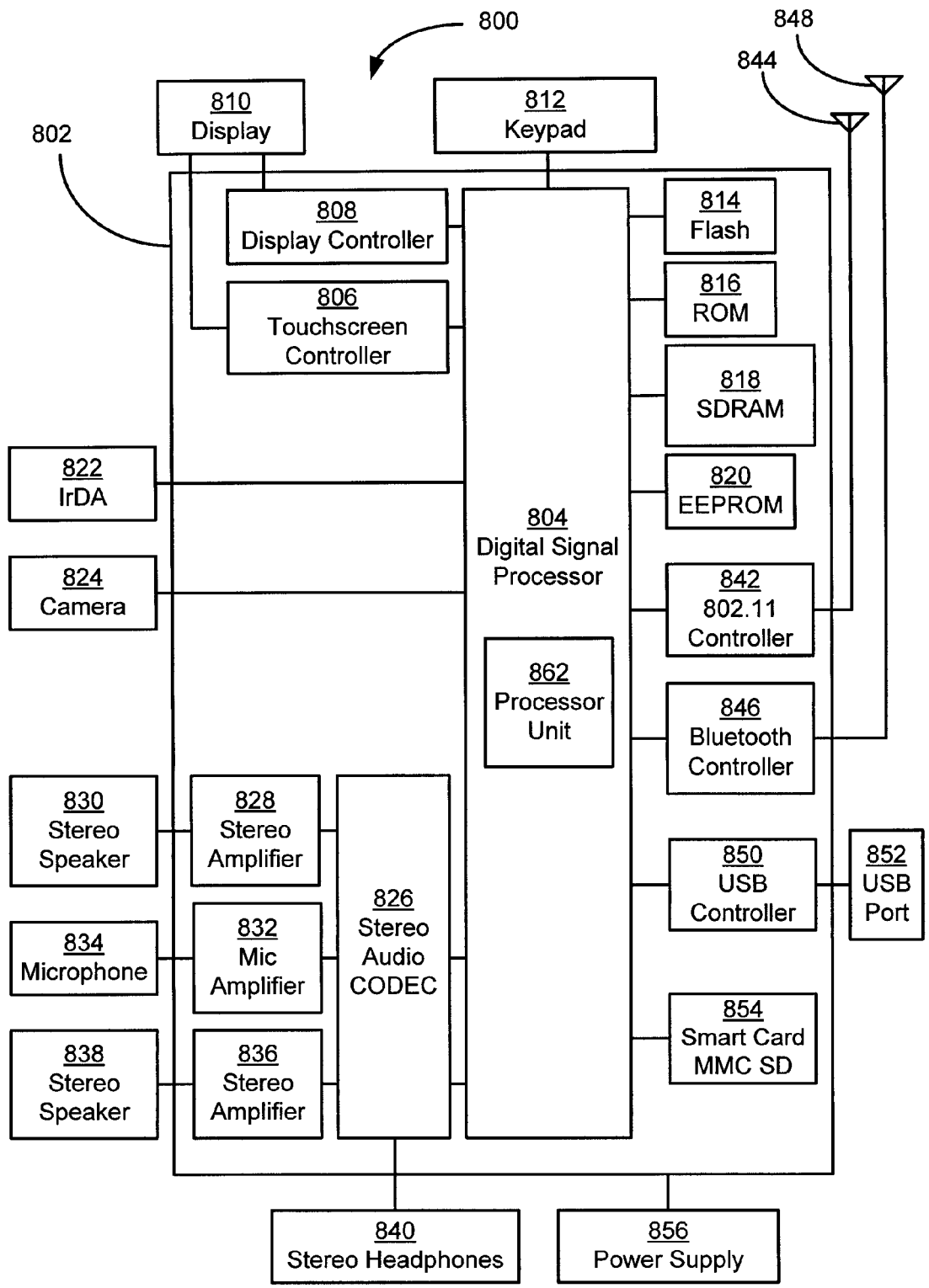
FIG. 8 is a general diagram illustrating an example portable digital assistant that may include an embodiment of a processor unit.

FIG. 8 is a diagram illustrating an exemplary embodiment of a portable digital assistant (PDA) 800. As shown, the PDA 800 includes an on-chip system 802 that includes a digital signal processor (DSP) 804. A touchscreen controller 806 and a display controller 808 are coupled to the DSP 804. Further, a touchscreen display 810 is coupled to the touchscreen controller 806 and to the display controller 808. The general diagram of FIG. 8 also indicates that a keypad 812 may be coupled to the DSP 804.

In a particular embodiment, a stereo audio CODEC 826 may be coupled to the DSP 804. A first stereo amplifier 828 may be coupled to the stereo audio CODEC 826 and a first stereo speaker 830 may be coupled to the first stereo amplifier 828. Additionally, a microphone amplifier 832 may be coupled to the stereo audio CODEC 826 and a microphone 834 may be coupled to the microphone amplifier 832. The general diagram of FIG. 8 further shows a second stereo amplifier 836 that may be coupled to the stereo audio CODEC 826 and a second stereo speaker 838 that may be coupled to the second stereo amplifier 836. In a particular embodiment, stereo headphones 840 may also be coupled to the stereo audio CODEC 826.

The general diagram of FIG. 8 also illustrates an 802.11 controller 842 that may be coupled to the DSP 804 and an 802.11 antenna 844 that may be coupled to the 802.11 controller 842. Moreover, a Bluetooth controller 846 may be coupled to the DSP 804 and a Bluetooth antenna 848 may be coupled to the Bluetooth controller 846. A USB controller 850 may be coupled to the DSP 804 and a USB port 852 may be coupled to the USB controller 850. Additionally, a smart card 854, e.g., a multimedia card (MMC) or a secure digital card (SD), may be coupled to the DSP 804. Further, a power supply 856 may be coupled to the on-chip system 802 and may provide power to the various components of the PDA 800.

As indicated in the general diagram of FIG. 8, the display 810, the keypad 812, the IrDA port 822, the digital camera 824, the first stereo speaker 830, the microphone 834, the second stereo speaker 838, the stereo headphones 840, the 802.11 antenna 844, the Bluetooth antenna 848, the USB port 852, and the power supply 856 may be external to the on-chip system 802 and coupled to one or more components on the on-chip system 802. In a particular embodiment, the DSP 804 includes a processor unit 862, as described with reference to FIG. 2 or 3, that can allocate interrupts to threads and decrease overhead, such as latency due to interrupt processing, and/or allow high priority tasks to be executed earlier. For example, the DSP 804 may be a multi-threaded processor in which each thread can be assigned a priority based on the priority of the task the thread is processing. The processor unit 862 can receive an interrupt and determine a thread to which to send the interrupt for processing based on the priority of each thread, such as a thread that is not processing a task or a low priority thread.

Figure 9:
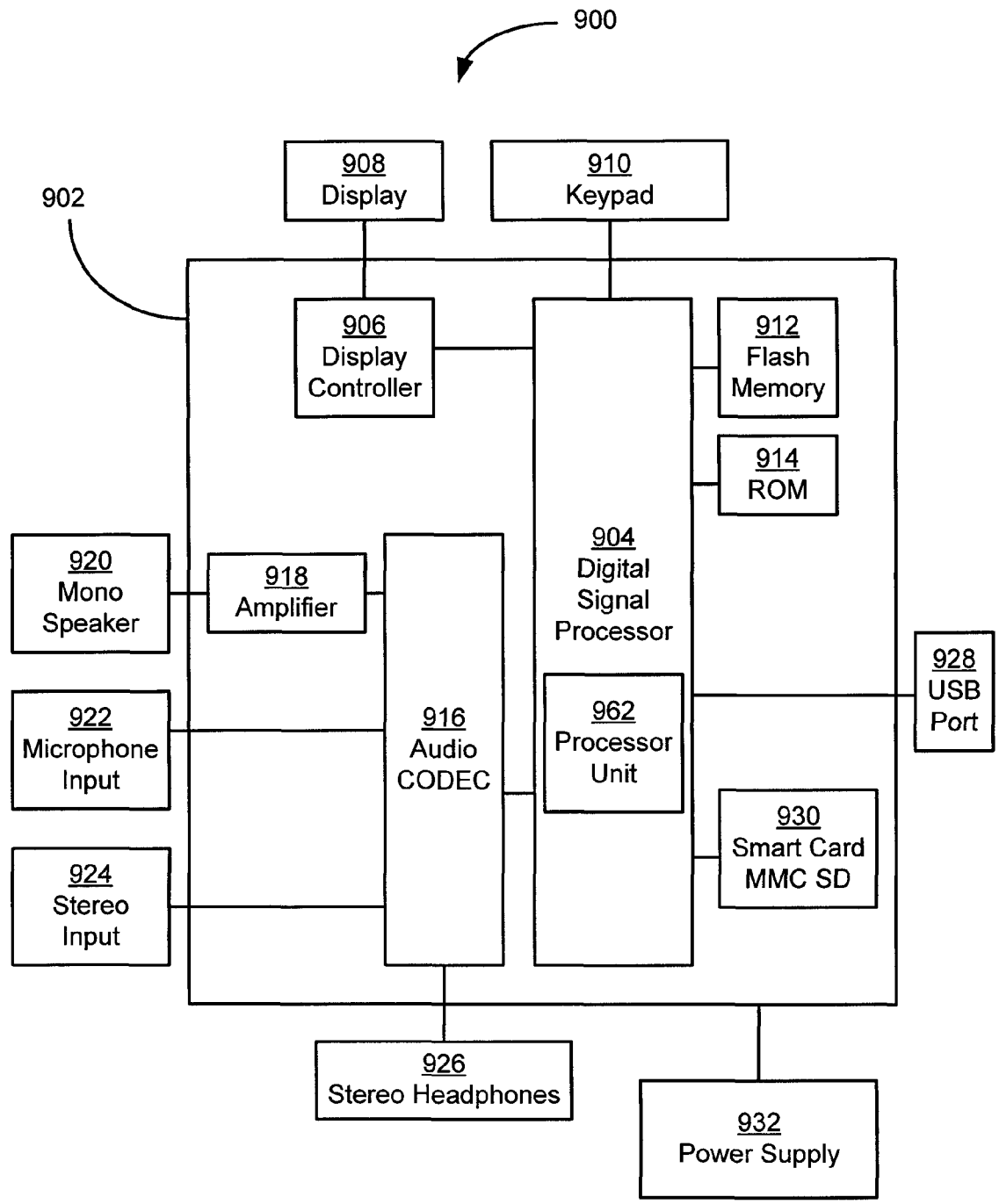
FIG. 9 is a general diagram illustrating an example audio file player that may include an embodiment of a processor unit.

FIG. 9 is a diagram illustrating an exemplary embodiment of an audio file player (e.g., MP3 player) 900. As shown, the audio file player 900 includes an on-chip system 902 that includes a digital signal processor (DSP) 904. A display controller 906 may be coupled to the DSP 904 and a display 908 is coupled to the display controller 906. In an exemplary embodiment, the display 908 is a liquid crystal display (LCD). A keypad 910 may be coupled to the DSP 904.

As further depicted in the general diagram of FIG. 9, a flash memory 912 and a read only memory (ROM) 914 may be coupled to the DSP 904. Additionally, in a particular embodiment, an audio CODEC 916 may be coupled to the DSP 904. An amplifier 918 may be coupled to the audio CODEC 916 and a mono speaker 920 may be coupled to the amplifier 918. The general diagram of FIG. 9 further indicates that a microphone input 922 and a stereo input 924 may also be coupled to the audio CODEC 916. In a particular embodiment, stereo headphones 926 may also be coupled to the audio CODEC 916.

A USB port 928 and a smart card 930 may be coupled to the DSP 904. Additionally, a power supply 932 may be coupled to the on-chip system 902 and may provide power to the various components of the audio file player 900.

As indicated in the general diagram of FIG. 9 the display 908, the keypad 910, the mono speaker 920, the microphone input 922, the stereo input 924, the stereo headphones 926, the USB port 928, and the power supply 932 are external to the on-chip system 902 and coupled to one or more components on the on-chip system 902. In a particular embodiment, the DSP 904 includes a processor unit 962, as described with reference to FIG. 2 or 3, that can allocate interrupts to threads and decrease overhead, such as latency due to interrupt processing, and/or allow high priority tasks to be executed earlier. For example, the DSP 904 may be a multi-threaded processor in which each thread can be assigned a priority based on the priority of the task the thread is processing. The processor unit 962 can receive an interrupt and determine a thread to which to send the interrupt for processing based on the priority of each thread, such as a thread that is not processing a task or a low priority thread.

General

The foregoing description of the embodiments of the inventive concepts disclosed herein has been presented only for the purpose of illustration and description and is not intended to be exhaustive or to limit the inventive concepts disclosed herein to the precise forms disclosed. Numerous modifications and adaptations are apparent to those skilled in the art without departing from the spirit and scope of the inventive concepts disclosed herein.

What is claimed is:

1. A multithreaded processor comprising:
a plurality of threads, each thread of the plurality of threads capable of executing a corresponding task;
a priority encoder configured to provide an indication of a lowest priority thread of the plurality of threads, the lowest priority thread having a lowest priority based on a corresponding priority of each thread of the plurality of threads, wherein the priority encoder is configured to receive the corresponding priority of each thread of the plurality of threads from a corresponding register of a plurality of registers; and
an interrupt module configured to receive the indication of the lowest priority thread and to assign an interrupt to the one of the lowest priority thread.

2. The multithreaded processor of claim 1, wherein a particular priority of a particular thread corresponds to a particular task priority of a particular task being executed by the particular thread.

3. The multithreaded processor of claim 1, wherein the interrupt module is configured to assign the interrupt to the lowest priority thread by allocating the interrupt to the lowest priority thread, and wherein the lowest priority thread is configured to stop processing a particular corresponding task and to process the interrupt.

4. The multithreaded processor of claim 3, wherein the interrupt is associated with an interrupt handler, and wherein the lowest priority thread is configured to process the interrupt by processing the interrupt handler.

5. The multithreaded processor of claim 1, wherein the interrupt module is further configured to compare the corresponding priority of each thread of the plurality of threads to an interrupt priority of the interrupt.

6. The multithreaded processor of claim 1, wherein the interrupt module is configured to assign the interrupt to the lowest priority thread based on an interrupt priority of the interrupt and a particular priority of the lowest priority thread.

7. The multithreaded processor of claim 1, wherein the priority encoder provides the indication of the lowest priority thread in response to a request from the interrupt module.

8. A method comprising:
executing a first task on a first thread;
executing a second task on a second thread;
determining a first thread priority of the first thread based on a first task priority of the first task;
determining a second thread priority of the second thread based on a second task priority of the second task;
receiving an interrupt having an interrupt priority;
indicating, by a priority encoder to an interrupt module, a lowest priority thread of a plurality of threads, the lowest priority thread having a lowest thread priority based on a corresponding thread priority of each thread of the plurality of threads, wherein the plurality of threads includes the first thread and the second thread, and wherein the priority encoder is configured to receive the corresponding thread priority of each thread of the plurality of threads from a corresponding register of a plurality of registers; and
allocating the interrupt, by the interrupt module, to the lowest priority thread.

9. The method of claim 8, wherein allocating the interrupt comprises:
stopping the second task based on the second thread priority being the lowest thread priority; and
providing the interrupt to the second thread for processing.

10. The method of claim 9, wherein allocating the interrupt comprises determining the interrupt priority is a higher priority than the second thread priority.

11. The method of claim 9, further comprising processing the interrupt by the second thread by processing an interrupt handler associated with the interrupt.

12. The method of claim 8, wherein allocating the interrupt comprises:
determining whether the interrupt priority is a lower priority than the first thread priority and the second thread priority; and
allocating the interrupt to a queue in response to determining that the interrupt priority is a lower priority than the first thread priority and the second thread priority.

13. A processor unit comprising:
an interrupt module configured to receive an interrupt and to allocate the interrupt to a lowest priority thread; and
an execution module comprising:
a first thread configured to execute a first task associated with a first priority;
a first register configured to store a first thread priority corresponding to the first priority;
a second thread configured to execute a second task associated with a second priority;
a second register configured to store a second thread priority corresponding to the second priority; and
a priority encoder configured to indicate to the interrupt module the lowest priority thread based on a corresponding thread priority of each thread of a plurality of threads, wherein the plurality of threads includes the first thread and the second thread, and wherein the priority encoder is configured to receive the corresponding thread priority of each thread of the plurality of threads from a corresponding register of a plurality of registers.

14. The processor unit of claim 13, wherein the interrupt module is configured to:
determine whether an interrupt priority is a higher priority than the first thread priority, wherein the first thread priority corresponds to the lowest priority thread; and
allocate the interrupt to the first thread when the interrupt priority is higher than the first thread priority by providing the interrupt to the first thread, wherein the first thread is configured to stop processing the first task and to process the interrupt.

15. The processor unit of claim 14, wherein the execution module is configured to store the first task and to modify the first thread priority to correspond to the interrupt priority.

16. The processor unit of claim 14, wherein the first thread processes the interrupt by processing an interrupt handler associated with the interrupt.

17. An apparatus comprising:
means for encoding configured to provide an indication of a lowest priority thread, the lowest priority thread having a lowest priority based on a corresponding priority of each thread of a plurality of threads, wherein each thread of the plurality of threads is capable of executing a corresponding task, and wherein the means for encoding is configured to receive the corresponding priority of each thread of the plurality of threads from a corresponding means for storing data of a plurality of means for storing data; and means for managing an interrupt, the means for managing configured to receive the indication of the lowest priority thread and to assign the interrupt to the lowest priority thread.

18. The apparatus of claim 17, wherein the means for encoding provides the indication of the lowest priority thread in response to a request from the means for managing.

19. A non-transitory computer-readable medium including program code that, when executed by a processor, causes the processor to:

execute a first task on a first thread;

execute a second task on a second thread;

determine a first thread priority for the first thread based on a first task priority of the first task;

determine a second thread priority for the second thread based on a second task priority of the second task;

receive an interrupt having an interrupt priority;

receive, from a priority encoder, an indication of a lowest priority thread of a plurality of threads, the lowest priority thread having a lowest thread priority based on a corresponding thread priority of each thread of the plurality of threads, wherein the plurality of threads includes the first thread and the second thread, and wherein the priority encoder is configured to receive the corresponding thread priority of each thread of the plurality of threads from a corresponding register of a plurality of registers; and allocate the interrupt to the lowest priority thread.

20. The non-transitory computer-readable medium of claim 19, wherein allocating the interrupt comprises:

stopping the second task based on the second thread priority being the lowest thread priority; and providing the interrupt to the second thread for processing.

21. An apparatus comprising:

means for managing an interrupt, the means for managing configured to receive an indication of a lowest priority thread of a plurality of threads including a first thread configured to execute a first task associated with a first task priority and a second thread configured to execute a second task associated with a second task priority;

a plurality of means for storing data comprising:

first means for storing data configured to store a first thread priority corresponding to the first task priority; and second means for storing data configured to store a second thread priority corresponding to the second task priority; and means for encoding configured to provide the indication of the lowest priority thread to the means for managing the interrupt, the lowest priority thread having a lowest thread priority based on a corresponding thread priority of each thread of the plurality of threads, wherein the corresponding priority of each thread of the plurality of threads is received from a corresponding means for storing data of the plurality of means for storing data.

22. The apparatus of claim 21, wherein the means for managing is configured to:

determine whether an interrupt priority of a received interrupt is a higher priority than the first thread priority when the first thread priority corresponds to the lowest priority thread; and allocate the interrupt to the first thread by providing the interrupt to the first thread, wherein the first thread is configured to, based on receiving the interrupt, stop processing the first task and to process the interrupt.

* * * * *